March 21, 1967 B. N. WHITLOCK 3,309,796
SELECTIVE POINTER BAND SYSTEM FOR TEACHING MACHINES
Filed April 5, 1965 3 Sheets-Sheet 1

INVENTOR
BRUCE N. WHITLOCK
BY George H. Fritzinger
AGENT

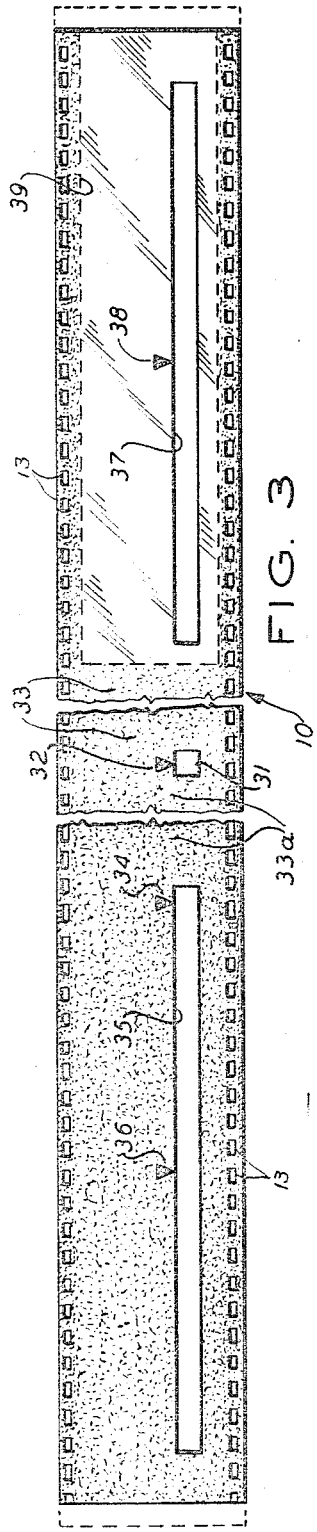
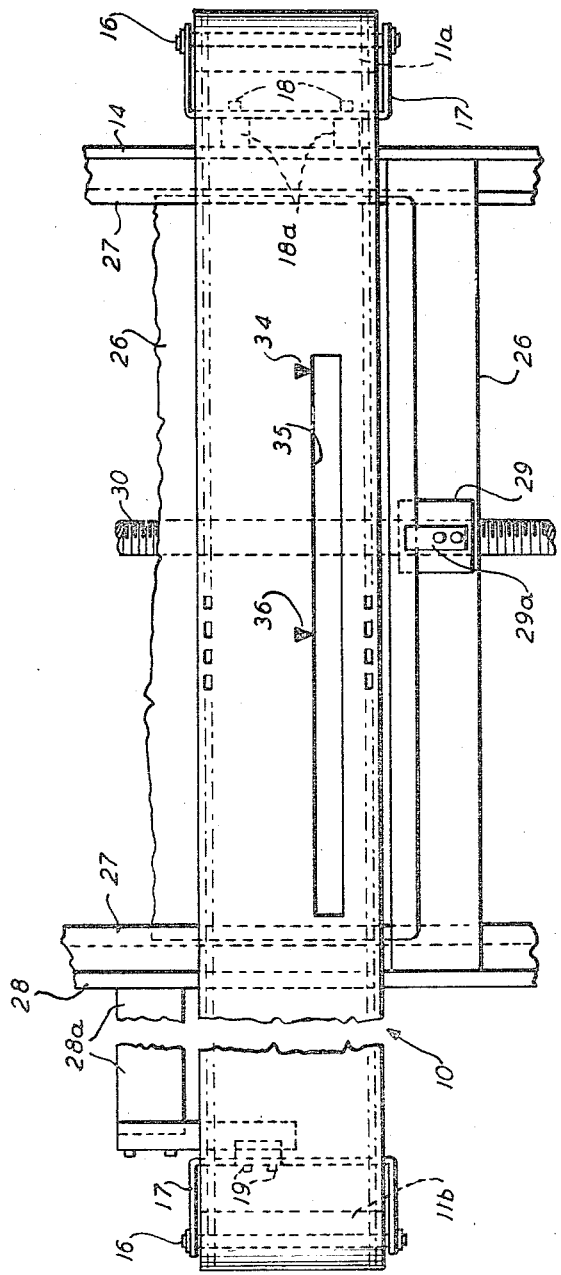

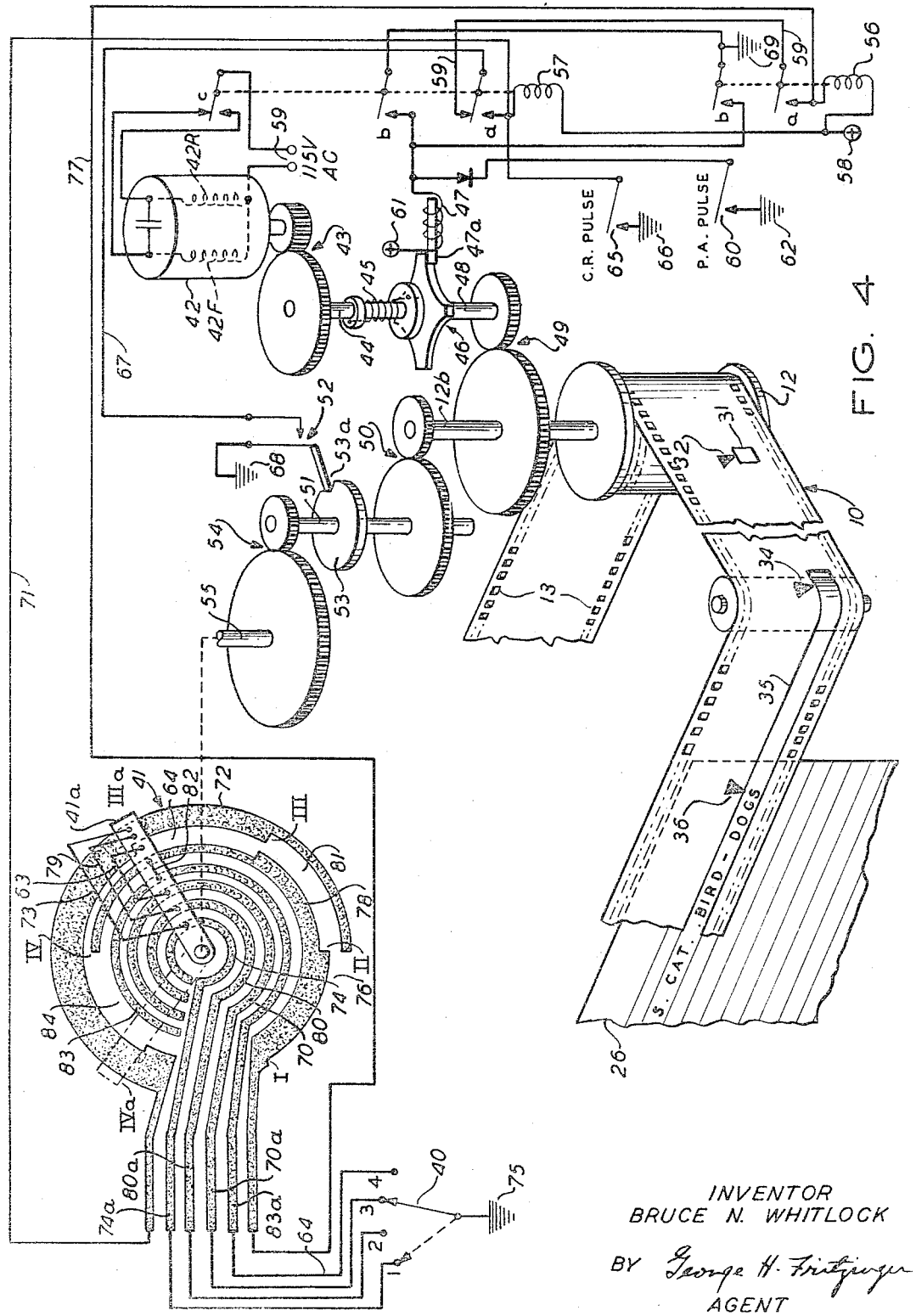

United States Patent Office 3,309,796
Patented Mar. 21, 1967

3,309,796
SELECTIVE POINTER BAND SYSTEM FOR TEACHING MACHINES
Bruce N. Whitlock, Morris Plains, N.J., assignor to McGraw-Edison Company, Elgin, Ill., a corporation of Delaware
Filed Apr. 5, 1965, Ser. No. 445,413
12 Claims. (Cl. 35—76)

This invention relates to a pointer system for designating the respective characters on an exhibitor card of a teaching machine, and more particularly it relates to a pointer system using a pointer band having different style zones of character designation and having a selector means for bringing the different style zones into operative relation to the exhibitor card.

The invention is particularly adapted for use with the teaching machine system shown and described in the pending Kobler et al. application, Ser. No. 185,616, filed Apr. 6, 1962 (now Patent No. 3,281,959, dated Nov. 1, 1966) and entitled, "Educational System and Apparatus," but no unnecessary limitation to that system is intended.

An object of the invention is to provide a unitary pointer system selectively adaptable for designating characters, words and sentences on an exhibitor card in different styles according to the state of advance and age level of the pupil.

Another object is to provide such pointer system which employs a pointer means in the form of a band having different styles of indication thereon along different lengths thereof.

Another object is to provide such pointer band in the form of a closed loop with means for driving the band by steps to designate successive characters and for driving it continuously through selected distances to bring selected style zones into operative relation to the exhibitor card. The advantage of a closed loop is that the band need not be wrapped on itself. This eliminates scuffing the surfaces, transfer of dirt thereonto, etc. Also, it eliminates the need for a take-up mechanism.

Another object is to provide a zone selector drive system including a manual selector switch and a directional-control commutator for shifting the pointer band into a selected style zone and including a home switch operable by the drive motor to move the pointer band within the selected zone to a home position.

Another object is to provide a novel, economical and dependable pointer system for teaching machines.

A feature of the invention resides in providing a pointer band having the following pointer styles: (1) a single character designation by means of a hole for exhibiting only one character at a time, (2) a cumulative character designation by means of a window with an arrow at the leading end thereof in which the window is as long as the width of the exhibitor card to show all characters in a line already designated by the arrow, (3) a continuous full line designation by a window twice the length of the printed line with an arrow midway the length of the window, and (4) a continuous multiple line showing by a window twice the length of a printed line with an arrow midway the length and by a transparent area to show continuously one or more printed lines already traversed by the window.

These and other objects and features of the invention will be apparent from the following description and the appended claims.

In a description of my invention reference is had to the accompanying drawings, of which:

FIGURE 2 is a front elevational view showing a style zone portion of the pointer band loop extending across the exhibitor card;

FIGURE 3 is a view of the pointer band laid out rectilinearly (before it is joined into a loop) to show the different pointer style zones thereon; and FIGURE 4 is a pictorial view and schematic drawing of the drive mechanism and circuits for stepping the pointer band to designate successive characters and for shifting the pointer band to select different style zones.

Figure 1:
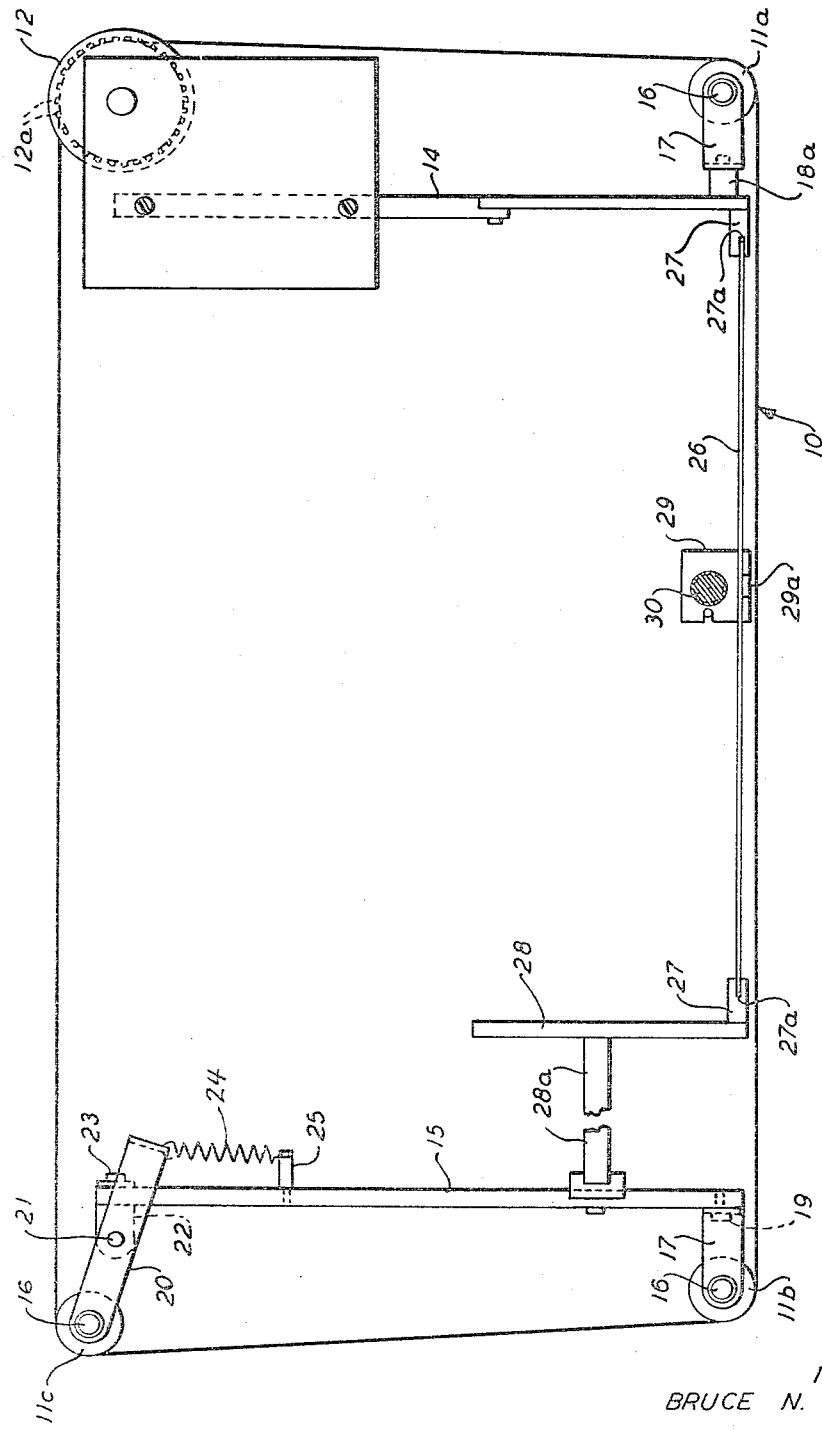
FIGURE 1 is a top plan view of the pointer band loop and exhibitor card and of the supporting means therefor.

The pointer band 10 shown in FIGURE 3 is joined at its ends into a loop and trained around four rollers as shown in FIGURE 1 of which three rollers 11a, 11b and 11c are small idler rollers and the fourth roller 12 is a relatively large drive sprocket roller. The pointer band is made from 70 millimeter film leader strip approximately 64 inches long and is joined into a loop by overlapping and cementing the end portions. The band has rows of sprocket holes 13 along each side edge spaced at $3/16''$ intervals which are engaged by sprocket teeth 12a on the drive sprocket roller 12. The two idler rollers 11a and 11b are located at the front right and left corners of the loop, the third idler roller is at the left rear corner thereof and the sprocket drive roller 12 is at the right rear corner thereof. The guide roller 11a and sprocket drive roller 12 are carried by a frame plate 14 and the other two guide rollers by a frame plate 15. The guide roller 11a is journaled on a pin 16 carried at its ends by a U-bracket 17 which is in turn secured by screws 18 through spacer blocks 18a to the frame 14. The idler roller 11b is likewise journaled on a pin 16 carried by a U-bracket 17 secured by screws 19 to the frame plate 15. The third guide roller 11c is journaled also on a pin 16 which is supported however in a relatively deep U-bracket 20 pivoted on a cross pin 21 midway the length of the side arms thereof. The pivot pin 21 is carried by a U-bracket 22 fitted within the bracket 20 and secured by screws 23 to the frame plate 15. A tension spring 24 connected between the U-bracket 20 and a pin 25 on the frame 15 urges the bracket 20 clockwise to place the pointer band loop under tension.

Behind the front run of the pointer band loop 10 between the front guide rollers 11a and 11b is a guide structure for supporting an exhibit card 26. This guide structure comprises a pair of guide ways 27 secured respectively to the frame plate 14 and to a plate 28 joined through a heavy bar 28a to the frame plate 15. The two guide ways 27 are vertically extending and provided with guide slots 27a facing inwardly toward each other for receiving slidably the opposite border portions of the exhibit card 26. A means for shifting the card vertically comprises a carriage block 29 having a notched portion engaging the lower border portion of the card and a spring clip 29a for holding the card in the notch. The carriage block is moved vertically by a lead screw 30 which is driven by means not shown through intervals to shift the card by steps equal to the distance between successive printed lines on the card. The portion of the pointer band loop extending crosswise of the exhibit card carries a pointer means for designating successive characters in a line on the front side of the card. The card may have a width of the order of ten inches across which there may be printed as many as thirty-three characters in a line at intervals of $9/32''$. Except as otherwise herein described, the pointer band is sandblasted or otherwise treated to render it nearly opaque.

As shown in FIGURE 3, the pointer band strip 10 has a first pointer means consisting simply of a square hole 31 with an arrow 32 thereabove and having solid opaque portions 33 and 33a at opposite sides of the pointer hole extending through lengths equal to the width of the exhibit card. This portion constitutes a first style zone on the card. In the home position of this style zone the pointer hole 31 stands one interval (9/32″) to the left of the first character in a printed line on the card. As the pointer band is stepped by successive intervals in a rightward direction successive characters of the printed line are designated while all other characters remain hidden from view.

Spaced approximately by the width of the exhibit card from the pointer hole 31 via the solid opaque portion 33a is a second style zone consisting of an arrow 34 at the leading end of a rectangular cutout or window 35 extending lengthwise of the pointer band at least through a length equal to the width of the exhibit card. In the start of style II the arrow 34 stands one interval to the left of the first character of a printed line on the card. As the pointer band is stepped to the right by successive intervals, successive characters in the printed line are designated while all prior characters in that line remain in view. This is a cumulative viewing especially desirable when showing words.

Spaced leftwardly from the style II zone is the style III zone comprising an arrow 36 on the window 35 spaced approximately by the width of the card from the arrow 34 and an extension of the window 35 to the left of the arrow 36 by the width of the card. In this style III the arrow 36 points out successive characters in a printed line while the window 35 leaves the entire line continuously in view.

A fourth style zone comprises a rectangular cutout or window 37 of a length of twice the width of the card and a pointer 38 located midway the length of the window. This window is located at the bottom of a rectangular portion 39 of the band which is left in a transparent state by being free of sandblasting. The window 37 is spaced only a short distance from the adjacent end of the window 35 when the pointer band is joined into a loop and is spaced by a little more than the width of the card from the pointer hole 31 constituting the style I zone. This style IV differs from style III in that the transparent portion 39 allows the student to continue to view several of the printed lines on the card past which the pointer 38 has already passed. The preceding printed lines may not however be as clearly visible as the line exposed by the window 37 to provide a desirable contrast. This style IV is particularly desirable for pupils who are in the advanced stage of learning sentences which extend through several lines in length.

The respective pointer styles are selected by moving the respective style portions of the pointer band into a home or start position relative to the exhibit card. This selection is made by a tape drive mechanism shown in FIGURE 4 under control of a manual style-selector switch 40 operating through a direction-control commutator 41. The tape drive mechanism comprises a reversible A.C. motor 42 having a field winding connection 42F for forward drive and a field winding connection 42R for reverse drive. The motor is of a hysteresis synchronous type which runs typically at 1800 r.p.m. This type of motor—which can be stalled indefinitely—is used to start and stop the drive of the pointer band 10. The motor is coupled through gearing 43 of 4:1 step-down ratio to a shaft 44. The shaft 44 is coupled through a torsion spring 45 to a four lobe spider 46 which can be blocked at one-quarter turns by an armature 47a of a solenoid 47. It is to cushion the stopping of the system that the spring 45 is interposed between the spider 46 and shaft 44.

The spider 46 is connected to a shaft 48 which is coupled through gearing 49 of 5:1 step-down ratio to the shaft 12b of the sprocket drive roller 12. The shaft 12b is coupled through gearing 50 of 1.9:1 step-down ratio to a shaft 51. Secured to the shaft 51 is a cam 53 with a single peripheral notch 53a, and riding on the periphery of this cam is the movable member of a home switch 52 which determines the aforementioned home position of the tape 10 in each style zone. The shaft 51 is coupled by gearing 54 of 6:1 step-down ratio to a shaft 55. It is the shaft 55 which carries the armature 41a of the commutator 41. The gearing from the spider 46 to the sprocket drive roller 12 is such that the pointer band is advanced 9/32″ for each quarter turn of the spider. Thus, successive momentary activations of the solenoid 47 will produce successive step advances of the pointer band to point out successive characters on the exhibit card. Further, the gearing between the sprocket roller 12 and the cam 53 is such that the pointer band is at a home position for the selected pointer style when the home switch is open—i.e., engaging the notch 53a. This home position is one wherein the arrow of the respective style stands one step (9/32″) from the first character in the respective printed line of the card. The pointer band is moved from a home position in one style to a home position in the next adjacent style as the cam 53 is moved through one revolution again to open the home switch. Still further, the 6:1 step-down ratio in the gearing between the cam 53 and commutator 41 means that the armature 41a is moved through one-sixth revolution as the pointer band is moved from one style to the next. The movement of the commutator armature 41a in style I is through the 60° interval from position I to position II, in style II through the 60° from position II to position III, in style III through the 60° from position III to position IIIa, in moving from the end of style III to style IV it is the 60° from position IIIa to position IV, and in style IV it is the 60° from position IV to position IVa. It is apparent from FIGURE 4 that the armature 41a can never be moved through the 60° interval direct from style IV to style I, since the armature would then have to traverse the lead out strips of the commutator. The need for ever shifting direct from style IV to style I is avoided by designing the commutator so that it will reverse the drive motor whenever a lower numbered style is selected and will advance the drive motor whenever a higher numbered style is selected.

The motor 42 and the brake solenoid 47 are controlled by an advance relay 56 and a return relay 57. Both relays are powered from a plus source of voltage designated by the terminal 58, which may typically be a source of 28 volts. In the positioning of the drive mechanism shown in FIGURE 4 the pointer 36 stands near the end of the card 26 and the commutator armature 41a stands near the point IIIa marking the end of its travel in the style III zone.

After a style zone has been selected both the advance relay 56 and the return relay 57 will stand unactivated, as will be apparent. The motor 42 will be energized to run in a forward direction from the supply terminals 59 via a switch 57c upper contact of the return relay 57, but the drive mechanism will be standing blocked by reason of the brake solenoid 47 engaging one of the lobes of the spider 46. If a pulse of say 10 millisecond duration is fed to the solenoid 47 by momentarily closing a pointer-advance pulse switch 60 to complete a circuit for the solenoid from a plus terminal 61 to ground 62, the solenoid 47 will be activated to release momentarily the spider 46 and allow it to be rotated one-quarter turn. Since it takes the motor of the order of 33 milliseconds to rotate the spider one-quarter turn, the advance pulse must be substantially shorter than 33 milliseconds, say typically 10 to 15 milliseconds, so that the armature 47a is returned to a blocking position in advance of the next lobe of the spider. Successive pulses of the solenoid 47 will thus step the pointer band ahead by successive 9/32″ intervals to designate successive characters on the exhibit card 26.

As the pointer arrow 36 is moved from home position along a full length of a printed line on the card, the commutator armature 41a is moved through somewhat less than a full 60° style zone, leaving the bridging contact 63 of the armature still registering with an open segment 64 of the commutator and the home switch 52 still closed when the last character on a line is pointed out. The next step after the last character is pointed out and the pupil has typed the same (as is disclosed in the aforementioned Kobler et al. application) is to activate the return relay 57 by closing momentarily a carriage-return pulse switch 65. In the first instance, the return relay is activated from the plus terminal 58 via the pulse switch 65 to ground 66 but the instant the relay is operated it receives a holding circuit via its hold switch 57a lower contact, lead line 67, home switch 52 and ground 68. Also, as the return relay is operated it activates the brake solenoid 47 via a switch 57b of the relay and ground 69, and it shifts the motor switch 57c to its lower contact to activate the reverse winding 42R to start the motor running in a reverse direction. Note that the motor can start immediately now because the brake solenoid 47 is activated. At the same time the motor is reversed the card 26 is raised by one line interval by suitable actuation of the lead screw 30. The reverse movement of the drive motor continues until the pointer arrow 36 is moved one interval to the left of the first character on the new line of the card now in registration with the window 35. As always, this home position is determined by the cam 53 opening the home switch 52. The instant the home switch is opened the return relay is dropped to shift the switch 57c to its upper contact and return the motor to its forward direction, to open the switch 57b to brake the forward drive of the pointer band and to return the switch 57a to its upper contact to disable the hold circuit for the return relay. The drive mechanism is thus restored to its original condition wherein successive activations of the brake solenoid 47 will step the pointer band ahead to designate successive characters on the exhibit card. Throughout the range of movement of the commutator armature 41a within the third style zone the contact bridge 63 registers with the open segment 64 at one end and with a slip ring 70 at the other end. This slip ring has a lead-out terminal 70a connected to style contact III of the selector switch 40. Thus, throughout the movement range of the commutator within the third zone the circuit via the selector switch 40 is open.

If it is desired to select a different pointer style say style I the selector switch is shifted to its number I position dottedly indicated in FIGURE 4. This completes a circuit from the plus terminal 58 via the return relay 57, lead 71, arcuate commutator segment 72, contact bridge 73, slip ring 74, lead-out terminal 74a and contact I of the selector switch 40 to ground 75. The activation of the return relay starts running the pointer band 10 in the reverse direction the same as before-described. When the contact bridge 73 rides off the arcuate commutator segment 72 into the open segment 76 the circuit via the selector switch 40 is broken but the return relay 57 is continued to be activated by the home switch 52 until the pointer 32 is moved one interval to the left of the first character in the printed line on the exhibit card 26. At this home position of the pointer 32 the contact bridge 73 is still in the open segment 76 and the home switch 52 is open to drop the return relay. The dropping of the return relay conditions the drive mechanism for advancing the pointer band by successive intervals as the advance pulse switch 60 is repeatedly operated, the same as before-described.

If it is desired to change from style I to style II, the selector switch 40 is thrown to its number II position. This completes a circuit from the plus terminal 58 through the advance relay 56, lead 77, arcuate commutator segment 78, bridging contact 79, slip ring 80, lead-out terminal 80a and number II contact of the selector switch 40 to ground 75.

The pointer band is therefore driven forwardly and shortly after the contact bridge 79 is moved into the open segment 81 of the commutator the home switch 52 is also opened to drop the advance relay 56 and condition the drive mechanism for a step advance of the pointer band as before-described.

If it is desired to change from style II to style IV, the selector switch is shifted to its number IV position. This completes a circuit from the plus terminal 58 via the advance relay 56, lead 77, arcuate commutator segment 78, bridging contacts 82, slip ring 83, lead-out terminal 83a and terminal number IV of the selector switch 40 to ground 75. The pointer band 10 is therefore driven in a forward direction and shortly after the contact bridge 82 moves into the open segment 84 the home switch 52 is also opened to drop the advance relay 56 and stop the pointer band with the pointer 38 at one interval to the left of the first character in the printed line on the exhibit card then registering with the window 37. The pointer band will then next be stepped ahead as the advance pulse switch 60 is repeatedly operated.

If it is desired to shift from the style IV to say style I the selector switch is shifted back to its number I position to complete the circuit from plus terminal 58 via the return relay 57, lead 71, arcuate commutator segment 72, contact bridge 73, slip ring 74 and terminal I of selector switch 40 to ground 75. This starts the drive running in the reverse direction by reason of the return relay 57 being first activated via the commutator 41 until the bridging contacts 73 move into the open segment 76 and then via the home switch 52 until the pointer 32 has traversed nearly the full length of the open segment 76 to bring the pointer into its home position at one interval to the left of the first printed character on the exhibit card, at which point the home switch 52 is opened to drop the return relay and condition the drive mechanism for stepping the pointer band ahead responsive to an operation of the advance pulse switch 60.

The embodiment of my invention herein particularly shown and described is intended to be illustrative and not necessarily limitative of my invention since the same is subject to changes and modifications without departure from the scope of my invention, which I endeavor to express according to the following claims.

I claim:

1. A selective pointer system for an exhibitor of a teaching machine, comprising a holder for a card medium having characters printed thereon along successive parallel lines, means for adjusting said holder vertically by intervals between successive lines, a pointer band mounted for movement crosswise of the card medium in the direction along said respective lines, said pointer band having thereon at intervals spaced at least by the width of said card medium a plurality of different indicating means forming different pointer style zones, means for driving said pointer band in directions lengthwise thereof, control means for said drive means including manually settable means for indexing said pointer band to bring a selected pointer style zone into registration with said card medium, and other control means for indexing said pointer band by intervals equal respectively to the spacing between successive characters printed on said card medium.

2. The pointer system set forth in claim 1 wherein said pointer band is of an opaque material and wherein one of said pointer means comprises a hole in said band to expose a single character at a time.

3. The pointer system set forth in claim 1 wherein said pointer band is of an opaque material and wherein one of said pointer means comprises a window lengthwise of said band and a pointing arrow at said window for designating successive characters printed on said exhibit card.

4. The pointer system set forth in claim 3 wherein said window has a length trailing said pointing arrow equal at least to the length of a printed line on said card medium and the window has a height sufficient only to expose one printed line on said card medium.

5. The pointer system set forth in claim 3 wherein said window is of a length equal to twice the length of said respective printed lines and is of a height to expose only one line at a time, and wherein said arrow is located midway the length of said window.

6. The pointer system set forth in claim 5 wherein said pointer band has a rectangular portion of translucent material encompassing said window and of a height equal to a plurality of printed lines on said card medium, said translucent portion being adapted to enable a plurality of already designated lines following the line designated by said window to be also in view.

7. A selective pointer system for an exhibitor of a teaching machine comprising a holder for a card medium having characters printed thereon along successive parallel lines, means for adjusting said holder vertically by the intervals between successive lines, a pointer band mounted for movement crosswise of the card medium in the direction along said respective lines, said pointer band being of an opaque material, said pointer band having in the sequence named: a first window of the height of a single line and of approximately twice the length of the respective line including a pointing arrow at the leading end of the window and a pointing arrow midway of the window, a second window of the height and width of a single character spaced ahead of said first window by approximately the length of a printed line on the exhibit card, a third window of the height of a single line and of at least twice the length of the respective lines spaced ahead of said second window by at least the length of a single respective line, said pointer band having an indicating arrow midway the length of said third window and having a translucent section embracing said third window and of a height of a plurality of the printed lines to expose to view a plurality of lines following the line in registration with said third window, means for driving said pointer band in directions lengthwise thereof, and control means for said drive means including a manually settable means for shifting said pointer band to place selected zones thereof in registration with said exhibit card.

8. A pointer system for an exhibit card of a teaching machine comprising a holder for said card, a pointer band mounted for movement crosswise of the card to point out successive characters printed in successive lines thereon, said pointer band having at intervals therealong successive style zones for differently exhibiting the printed characters on said card, said pointer band being in the form of a closed loop, a plurality of spaced rollers around which said pointer band loop is trained with a run of the pointer band between two of said rollers extending across the front side of said card, reversible drive means for one of said rollers, control means successively activatable to cause said drive means to step said pointer band ahead to designate successive characters in a printed line on said card, and other control means selectively adjustable to cause said drive means to shift said pointer band to bring selected style zones into operative relation to said card.

9. The pointer system set forth in claim 8 wherein said drive means includes a continuously energized drive motor and said step control means includes a spider coupled to said motor and a coacting solenoid having an armature engageable with said spider for braking said motor, and means for momentarily activating said solenoid to release said spider and allow said motor to advance said pointer band through a step distance.

10. The pointer system set forth in claim 8 wherein said drive means includes a continuously energized motor and a releasable means normally holding the motor braked to a standstill, and wherein said shift control means includes advance and return relays respectively activatable to cause said pointer band to be driven by said motor in advance and return directions, and activating circuits for said relays including a commutator and a commutator armature driven by said motor, said commutator having four style zones traversed respectively by said armature as the respective pointer band style zones are moved past said exhibit card, and a selector switch shiftable into respective style positions to cause the advance relay to be activated when the selected style zone is ahead of the zone then occupied and to cause the return relay to be activated when the selected zone is back of the zone then occupied.

11. The pointer system set forth in claim 10 wherein said commutator has electrically dead zones corresponding to the respective style zones for causing the circuits selected by said selector switch to be open during all positions of said pointer band within the selector style zone.

12. The pointer system set forth in claim 11 including a hold circuit for each of said relays including a hold switch operable closed by activation of the respective relay and including a home switch and a switch operating cam controlled by said motor for completing said hold circuits at all positions of said pointer band except when the band is in a home or start position of a respective style zone whereby upon shifting said pointer selector switch from one position to another said home switch maintains the respective relay activated as said armature traverses the portion of the respective dead zone of the commutator necessary to bring the pointer band to a home position for the selected style zone.

References Cited by the Examiner
UNITED STATES PATENTS

| | | | |
|---|---|---|---|
| 1,879,501 | 9/1932 | Rigler | 40—53 |
| 3,281,959 | 11/1966 | Kobler et al. | 35—6 |

EUGENE R. CAPOZIO, *Primary Examiner.*

H. S. SKOGQUIST, *Assistant Examiner.*